(12) United States Patent
Huang et al.

(10) Patent No.: US 11,150,083 B2
(45) Date of Patent: Oct. 19, 2021

(54) REAL-TIME OVERHEAD POWER LINE SAG MONITORING

(71) Applicant: The Curators of the University of Missouri, Columbia, MO (US)

(72) Inventors: Jie Huang, Rolla, MO (US); Rui Bo, Shoreview, MN (US)

(73) Assignee: The Curators of the University of Missouri, Columbia, MO (US)

( * ) Notice: Subject to any disclaimer, the term of this patent is extended or adjusted under 35 U.S.C. 154(b) by 0 days.

(21) Appl. No.: 16/762,701

(22) PCT Filed: Dec. 17, 2018

(86) PCT No.: PCT/US2018/065969
§ 371 (c)(1),
(2) Date: May 8, 2020

(87) PCT Pub. No.: WO2019/126020
PCT Pub. Date: Jun. 27, 2019

(65) Prior Publication Data
US 2021/0172729 A1    Jun. 10, 2021

Related U.S. Application Data

(60) Provisional application No. 62/607,215, filed on Dec. 18, 2017.

(51) Int. Cl.
| G01B 11/16 | (2006.01) |
| G01B 9/02 | (2006.01) |
| G01L 1/24 | (2006.01) |
| H02G 7/00 | (2006.01) |

(52) U.S. Cl.
CPC .......... *G01B 11/161* (2013.01); *G01B 9/0209* (2013.01); *G01L 1/242* (2013.01); *H02G 7/00* (2013.01)

(58) Field of Classification Search
None
See application file for complete search history.

(56) References Cited

U.S. PATENT DOCUMENTS

| 5,026,141 | A | * | 6/1991 | Griffiths | ................ | G01B 11/18 |
| | | | | | | 250/227.14 |
| 6,811,307 | B2 | | 11/2004 | Crowe et al. | | |
| 2004/0105635 | A1 | | 6/2004 | Nandi et al. | | |
| 2011/0218790 | A1 | * | 9/2011 | Algaonkar | ............. | G01K 11/32 |
| | | | | | | 703/13 |
| 2012/0082422 | A1 | | 4/2012 | Sarchi et al. | | |

(Continued)

OTHER PUBLICATIONS

Du, Yang, et al. "Cryogenic temperature measurement using Rayleigh backscattering spectra shift by OFDR." IEEE Photonics Technology Letters 26.11 (2014): 1150-1153. (Year: 2014).*

(Continued)

*Primary Examiner* — Shawn Decenzo
(74) *Attorney, Agent, or Firm* — Stinson LLP

(57) ABSTRACT

System and method for determining real-time sag and shape information of an electrical power line based on strain distribution along a length of an optical fiber associated with the power line. An embedded fiber coupled to an overhead transmission line measures strain using the backscatter of an optical signal, the optical signal is then interrogated using an interferometer.

17 Claims, 3 Drawing Sheets

(56) References Cited

U.S. PATENT DOCUMENTS

2017/0234919 A1    8/2017  Manuelpillai et al.
2018/0245907 A1*   8/2018  Froggatt .............. A61B 5/0066
2019/0113561 A1*   4/2019  Yogeeswaran ....... G01R 31/085

OTHER PUBLICATIONS

International Search Report dated Feb. 28, 2019 relating to PCT Application No. PCT/US18/65969, 4 pages.
Written Opinion dated Feb. 28, 2019 relating to PCT Application No. PCT/US18/65969, 7 pages.
Du, Yang Et Al., Rayleigh backscattering based macrobending single mode fiber for distributed refractive index sensing, Sensors and Actuators B: Chemical 248 (2017) pp. 346-350.
Ukil, Abhisek Et Al., Distributed Temperature Sensing: Review of Technology and Applications, IEEE Sensors Journal (May 2012) vol. 12, Issue 6, pp. 885-892.
Video Sagometer Application Guide, Final Report, dated Sep. 2001, 129 pages.
Kevin M. Klein et. al, "Real-Time Ampacity and Ground Clearance Software for Integration into Smart Grid Technology," IEEE, 2011 1-11 Atlanta, GA.

* cited by examiner

REAL-TIME OVERHEAD POWER LINE SAG MONITORING

CROSS-REFERENCE TO RELATED APPLICATIONS

The present application is a national stage application of PCT/US2018/065969, filed Dec. 17, 2018, which claims the benefit of U.S. Provisional Application No. 62/607,215, filed Dec. 18, 2017, the entirety of which is hereby incorporated by reference.

BACKGROUND

Overhead power lines tend to sag over time (e.g., as shown in FIG. 1), especially due to heating caused by carrying electricity. In some instances, a line may sag so low that it can violate ground clearance requirements and cause an outage. For this reason, utility companies apply conservative assumptions to determine the maximum carrying capacity of the power lines. Unfortunately, these conservative assumptions limit the true capability of the power lines.

Currently, there is no widely used real-time sag monitoring system in the field. Utilities use LiDAR and human inspection to record line sagging on an offline basis. There is a Video Sagometer product designed by Electric Power Research Institute (EPRI) that can provide real-time monitoring of the power line sagging. It requires mounting a charge coupled device (CCD) video camera on a transmission line structure such as a pole or transmission tower to monitor a small reflective target mounted on a conductor in an adjacent span. Machine vision algorithms analyze the image received by the camera to detect the small reflective target and determine sags and clearances. Flexing and bending of the transmission structure, the placement of the reflective target, and the length of the line span, particularly in uneven terrain, affect the measurement accuracy of such system. In addition, for lower voltage transmission/distribution systems having shorter line span, it may require the installation of many such systems, and result in a less cost-effective solution.

U.S. Pat. No. 6,811,307 discloses a distributed temperature sensing transducer for temperature profile measurements in a protective underground duct in which a high voltage cable has been laid. U.S. Patent Application Publication No. 2004/0105635 discloses using an optical fiber as a dynamic temperature sensor that provides real time data regarding the temperature of a cable. U.S. Patent Application Publication No. 2017/0234919discloses optical sensing methods and systems for power applications. The Electric Power Research Institute application guide for EPRI's Video Sagometer is found at: https://www.epri.com/#/pages/product/000000000001001921/.

SUMMARY

Aspects of the present disclosure relate to real-time monitoring of the overhead power line sag using optical fiber sensing technology for distributed strain or shape sensing. The real-time sag measurements employing aspect of the present disclosure may be used by utility companies for transmission line health monitoring and vegetation management. Supplemented by other information such as temperature measurements, the sagging measurements enable the calculation of the power line carrying limit in real-time for utility companies so that the capability of power lines can be fully utilized.

In an aspect, the disclosed system and method solve the problem of real-time measurement of power line sagging magnitude. Specifically, it provides a real-time sag measurement alongside the entire monitored power line in a highly cost-effective manner.

In an aspect, a system comprises an optical fiber associated with an electrical power line and an optical fiber-based strain sensor coupled to the optical fiber. The strain sensor transmits light into the optical fiber and receives a backscatter signal from the light reflected in the optical fiber. The system also includes a processor configured for determining strain distribution along a length of the optical fiber based on the backscatter signal and for determining real-time shape information relating to the power line as a function of the strain distribution.

In another aspect, a method of determining real-time shape information relating to a power line as a function of optical fiber-based strain distribution is provided.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
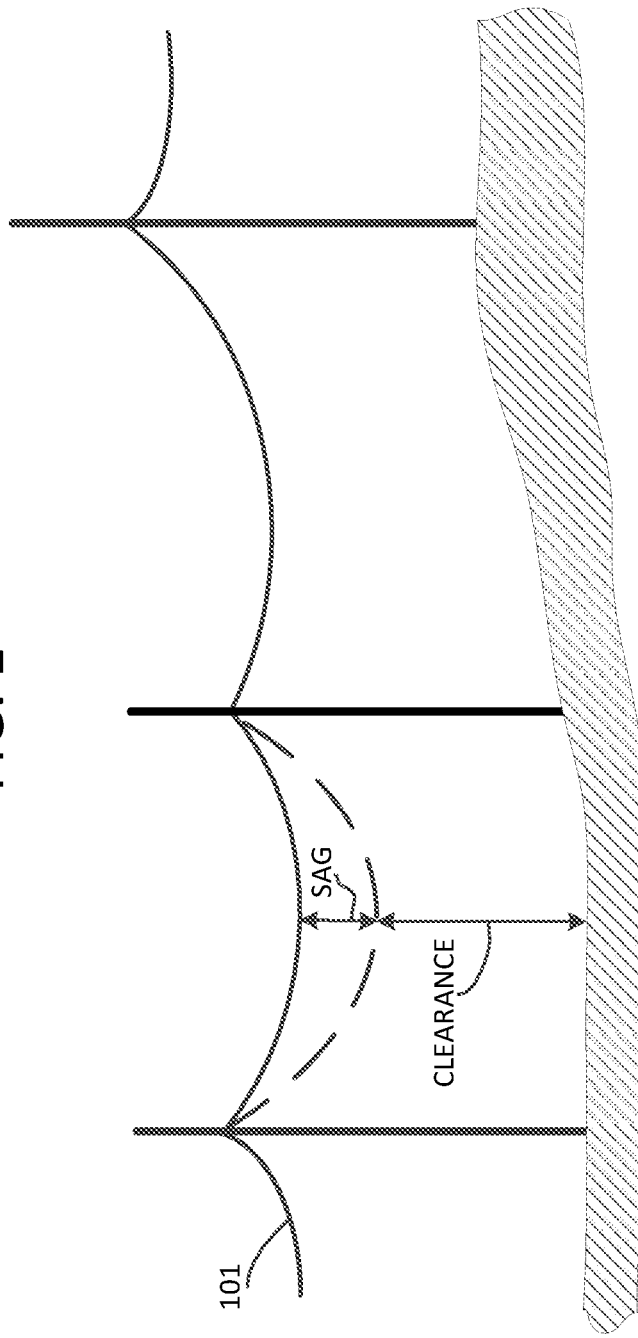
FIG. 1 illustrates exemplary power line sag.

Aspects of the present disclosure relate to real-time monitoring of the overhead power line sagging using optical fiber sensing technology for distributed strain or shape sensing. FIG. 1 illustrates an exemplary environment in which power line sag detection is used. As shown, overhead transmission line 101 carries electric power along its length. Conducting electricity causes the transmission line 101 to heat up and, in turn, sag. This sagging can violate the line's clearance requirement and cause outages. Utility companies may use the real-time sag measurements in accordance with aspects of the present disclosure for transmission line health monitoring, vegetation management, and the like. Supplemented by other information such as temperature measurements, the sag measurements also enable the calculation of the carrying limit of transmission line 101 in real-time for utility companies so that the capability of power lines can be fully utilized.

Advantageously, aspects of the present disclosure solve the problem of real-time measurement of power line sagging magnitude. Specifically, they provide a real-time sag measurement alongside the entire monitored power line in a highly accurate and cost-effective manner.

Figure 2:
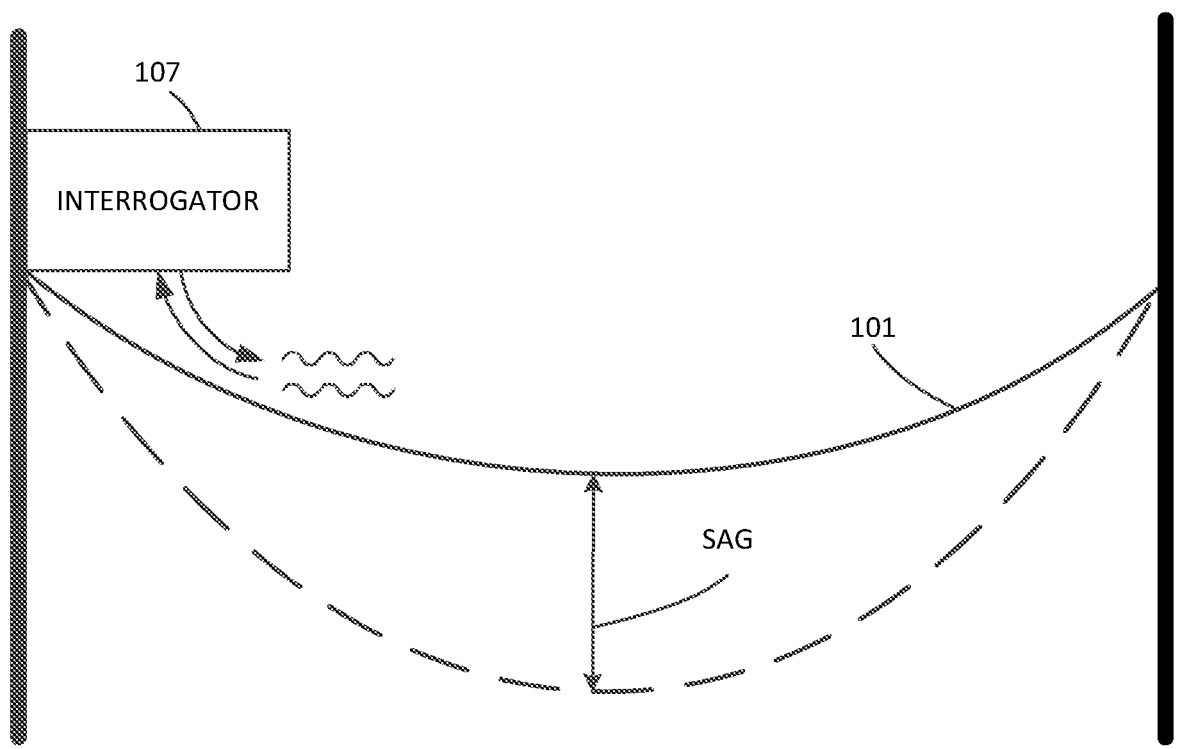
FIG. 2 illustrates distributed optical fiber sensing according to an embodiment of the present disclosure.

Distributed optical fiber sensing (DOFS) allows accurate measurement of temperature and/or strain at positions along the length of an optical fiber. In an embodiment, DOFS provides spatially-continuous sag monitoring of a power line in real time: Suitable DOFS technologies include Rayleigh scattering-based optical frequency domain reflectometry, Brillouin optical time domain analysis, and Brillouin optical time domain reflectometry. Each of these technologies provides real time strain or shape information of a commercial optical fiber over, for example, several kilometers long. FIG. 2 illustrates a sensing concept employing the DOFS technologies. An interrogator 107 sends a pulsed light or a continuous-wave light to an optical fiber associated with transmission line 101 and collects the backscattered signals from the optical fiber (i.e., Rayleigh scattering or Brillouin scattering). The collected signals are analyzed to calculate the strain distribution along the fiber. If the fiber is closely associated with power line 101, its shape can be accurately represented by the determined shape of the optical fiber.

In addition to sag, monitoring of the temperature and strain measurements in accordance with features of the present disclosure permit conductor fault analysis and may be used for improving conductor design.

Embodiments of the present disclosure have a wide range of applicability. For example, aspects apply to overhead power line conductors with or without optical fibers. For power line conductors that have embedded glass fibers, no installation of additional optical fiber is needed. Such conductors include Optical Ground Wires (OPGW), Aluminum Conductor Composite Core (ACCC) conductor, and Aluminum Conductor Composite Reinforced (ACCR) conductor. For power line conductors without optical fibers, including the most commonly used Aluminum Conductor Steel Reinforced (ACSR) conductor, All Aluminum Alloy Conductor (AAAC), and copper conductor, optical fiber is installed (e.g., glued or bonded) longitudinally alongside the conductor. In addition to bare conductors, aspects of the present disclosure also apply to insulated conductors and cables.

Figure 3:
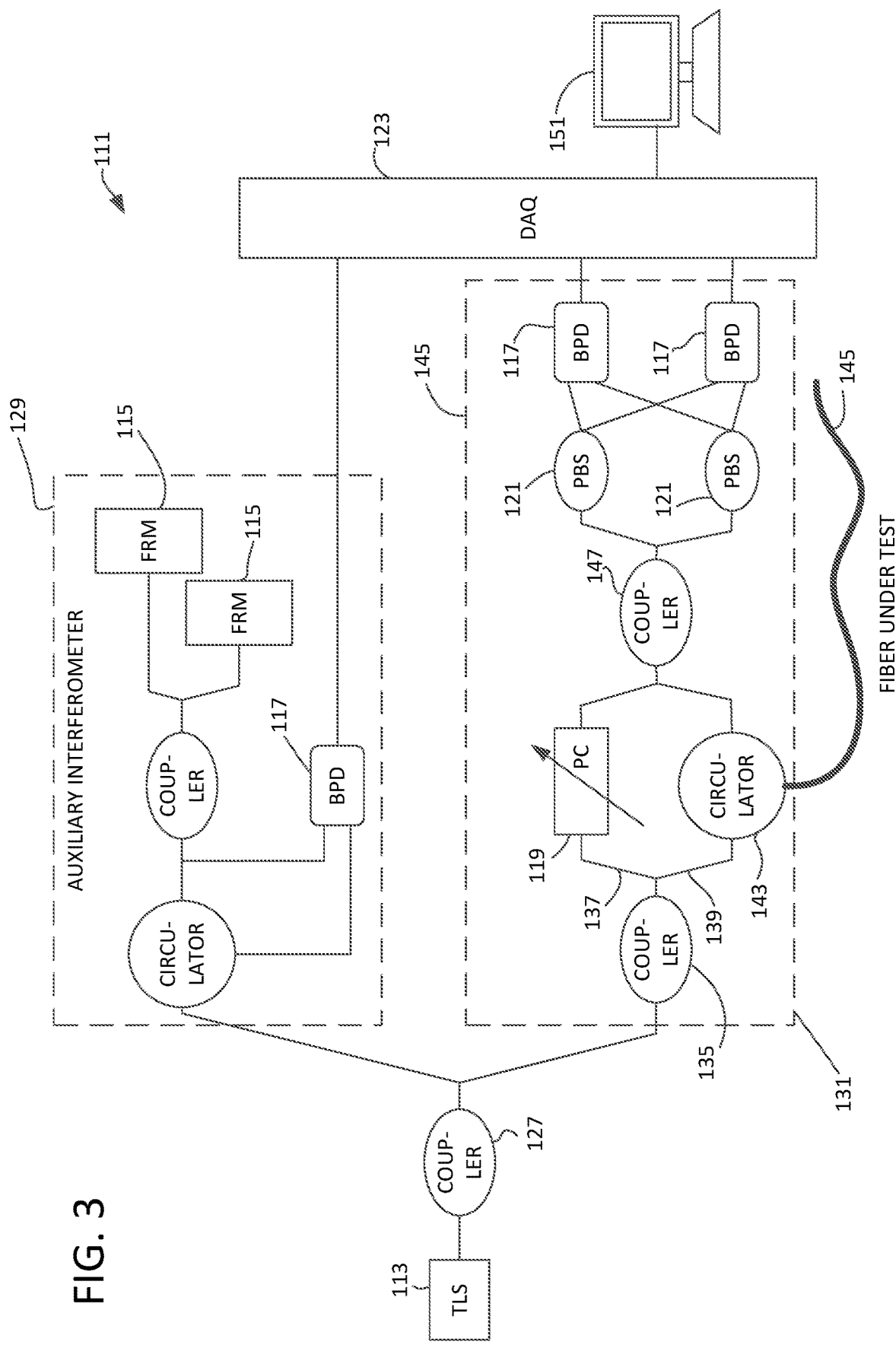
FIG. 3 illustrates a long-range optical frequency domain reflectometry (OFDR) based Rayleigh sensing system according to an embodiment of the present disclosure.

In FIG. 3, a system 111 for monitoring overhead power lines 101 according to one embodiment comprises a fundamental configuration of a long-range optical frequency domain reflectometry (OFDR) based Rayleigh sensing system. The system 111 includes a tunable laser source (TLS) 113, at least one Faraday rotation mirror (FRM) 115, at least one balanced photodetector (BPD) 117, a polarization controller (PC) 119, at least one polarization beam splitter (PBS) 121, and a data acquisition (DAQ) circuit 123.

Referring further to FIG. 3, the long-range OFDR based Rayleigh sensing system 111 includes the tunable laser source 113 used as the light source for the OFDR system. In the illustrated embodiment, a coupler 127 splits the light from the source 113 into two paths. One path is through an auxiliary interferometer 129, and the other path is through a main interferometer 131. The auxiliary interferometer 129 in one embodiment is a Michelson interferometer with two Faraday rotation mirrors 115, which provide an external clock for the DAQ circuit 123. Use of auxiliary interferometer 129 solves the problem of the non-linear effect of tunable laser source 113, which scans the frequency range and gives the correct time base corresponding to the DAQ circuit 123.

A coupler 135 shown in FIG. 3 splits the light through the main interferometer 131 into a reference path 137 and a signal path 139. The signal path 139 has a fiber coupler or circulator 143 whose one arm has a fiber under test (FUT) 145 (i.e., the optical fiber associated with power line 101 under inspection). In the illustrated embodiment, the polarization controller 119 in the reference path 137 modifies the state of light. A coupler 147 of system 111 collects backscattered light from the fiber under test 145. The coupler 147 combines the backscattered light with the reference signal from the polarization controller 119 and feeds into two BPDs 117 each via a corresponding polarization beam splitter 121.

The OFDR system 111 of FIG. 3 can achieve very high sensitivity and spatial resolution while balancing measurement resolutions, spatial resolution, and sampling rate for the scattering-based distributed sensing techniques. In an embodiment, the reference signal at 137 is initially recorded using a few scans of the OFDR system 111, and then the measured signal at 139 is used to analyze the Rayleigh backscattered signals. Moreover, a computer 151 executes program code for performing a Fast Fourier Transform (FFT) to convert the optical frequency domain signal obtained by the main interferometer 131 into a spatial domain signal. A sliding window ($\Delta x$) is used for the entire range of frequencies, and each window is converted back to the optical frequency domain. Cross-correlation of the reference signal and the measured signal is done to check the spectral shift of the backscattered spectrum, which corresponds to the change in strain/temperature along fiber under test 145.

The system 111 is configurable for long sensing range (e.g., 2 km). In an embodiment of such a system: 1) tunable laser source 113 works in 1550 nm with at least 5 nm tuning range, mode-hop-free greater than 20 nm/s tuning speed, less than 50 KHz linewidth, output power greater than 10 dbm, and high signal-to-noise ratio 80 dB/0.1 nm; 2) two Faraday rotation mirrors 115 are used with a 10 km delay fiber; 3) balanced photodetector 117 of up to 1 GHz bandwidth; 4) DAQ circuit 123 operating at greater than 14-bit and 1 GHz; and 5) polarization control 119.

Conventional monitoring of power line sag involves infrequent use of LiDAR (Light Detection and Ranging) surveys, which can only provide a snapshot of the power line conditions. Aspects of the present disclosure have many advantages over existing methods. For example, embodiments provide distributed high resolution (both spatially and temporally) measurements in a cost-effective, reliable, and maintenance-free manner. Moreover, embodiments are immune to electromagnetic field interference from the power lines. In addition to measuring sag, embodiments employing DOFS technologies as described herein measure temperature distribution along power lines 101 at the same time as measuring sag.

The distributed optical fiber sensing system 111, which involves the interrogator 107 of FIG. 2 or optical frequency domain reflectometry (OFDR) as shown in FIG. 3, provides a very cost-effective approach to monitoring overhead power lines 101. One such system 111 such as illustrated in FIG. 3 is equipped with a Rayleigh scattering based strain sensor and can produce real-time strain measurement for continuous power lines up to 30 km. Moreover, the system 111 can run 24*7 unattended with minimal to no maintenance requirement. The computer 151 can takes measurements at user-defined intervals (e.g., every 5 minutes). In an embodiment, computer 151 stores data locally, and transmits data through communication channels like Supervisory Control and Data Acquisition (SCADA) system to a transmission operator, where real-time power line rating can be calculated and further fed to a regional system operator for real-time operation and market-based economic dispatch. The same system can measure distributed temperature along the transmission line 101 at the same time so that the system 111 becomes even more cost-effective.

In an embodiment, system 111 for monitoring overhead power lines employing optical fiber-based sensing technology has the following advantages: it is a very cost-effective solution (in terms of cost/mile of the transmission line) for monitoring transmission lines over long distances because one system can cover transmission line of up to 30 km. The system 111 does not rely on geographical data and therefore can work on any terrain surface. The system 111 is insensitive to transmission structure flexing or bending. It has very high accuracy in measuring sags. In addition, it can provide not only the sag measurements but also the shape of the entire line being monitored. It is immune to electromagnetic interference. And, for power line conductors with embedded glass fibers such as Optical Ground Wires (OPGW), Aluminum Conductor Composite Core (ACCC) conductor, and Aluminum Conductor Composite Reinforced (ACCR) conductor, no installation along the existing conductor is needed.

It is to be understood that system 111 according to aspects of the present disclosure uses a reference point, which may be obtained from a LiDAR survey, to determine the ground clearance of the sagging power line.

In addition to the embodiments described above, embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer and comprises computer storage media and communication media. By way of example, and not limitation, computer storage media include both volatile and nonvolatile, removable and non-removable media implemented in any method or technology for storage of information such as computer-readable instructions, data structures, program modules or other data. Computer storage media are non-transitory and include, but are not limited to, random access memory (RAM), read-only memory (ROM), electrically erasable programmable ROM (EEPROM), compact disk ROM (CD-ROM), digital versatile disks (DVD), or other optical disk storage, solid state drives (SSDs), magnetic cassettes, magnetic tape, magnetic disk storage, or other magnetic storage devices, or any other medium that can be used to carry or store desired non-transitory information in the form of computer-executable instructions or data structures and that can be accessed by a computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory computer storage media, including nonvolatile and volatile memory types. A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer-readable media for storing data can be used, including magnetic cassettes, flash memory cards, digital video disks, Bernoulli cartridges, RAMs, ROMs, SSDs, and the like.

Communication media typically embody computer-readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter. In addition to the monitor, personal computers typically include other peripheral output devices (not shown), such as speakers and printers.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer-executable instructions may be stored on one or more tangible, non-transitory computer-readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
    an optical fiber associated with an overhead electrical transmission line;
    an optical fiber-based strain sensor coupled to the optical fiber, the strain sensor transmitting light into the optical fiber and receiving a backscatter signal from the light reflected in the optical fiber; and
    a strain processor configured for determining a strain distribution along a length of the optical fiber based on the backscatter signal and for determining real-time shape information relating to the transmission line as a function of the determined strain distribution of the optical fiber, the strain processor further configured for determining a temperature distribution of the optical fiber based on the backscatter signal, the determined temperature distribution being representative of a corresponding temperature distribution of the transmission line.

2. The system of claim 1, wherein the transmission line comprises a conductor having at least one embedded glass fiber and wherein the optical fiber associated with the transmission line comprises the embedded glass fiber.

3. The system of claim 1, wherein the optical fiber is attached to the transmission line along a length thereof.

4. The system of claim 1, wherein the optical fiber-based strain sensor coupled to the optical fiber comprises an interrogator for transmitting the light into the optical fiber and collecting backscattered signal from the optical fiber.

5. The system of claim 1, wherein the optical fiber-based strain sensor comprises a main interferometer receiving light from a light source and configured to compare a reference signal based on the received light to the backscatter signal from the optical fiber.

6. The system of claim 5, wherein the optical fiber-based strain sensor further comprises an auxiliary interferometer receiving the light from the light source and configured to provide a clock signal based thereon.

7. The system of claim 1, wherein the optical fiber-based strain sensor comprises a Rayleigh scattering-based optical frequency domain reflectometry sensor.

8. A method comprising:
transmitting light into an optical fiber associated with an electrical transmission line;
receiving a backscatter signal from the light reflected in the optical fiber;
determining a strain distribution along a length of the optical fiber based on the backscatter signal;
determining real-time shape information relating to the transmission line as a function of the strain distribution of the optical fiber; and
determining a temperature distribution of the optical fiber based on the backscatter signal, the determined temperature distribution being representative of a corresponding temperature distribution of the transmission line.

9. The method of claim 8, wherein the transmission line comprises a conductor having at least one embedded glass fiber and wherein the optical fiber associated with the transmission line comprises the embedded glass fiber.

10. The method of claim 8, further comprising bonding the optical fiber to the transmission line along a length thereof.

11. The method of claim 8, wherein transmitting the light into the optical fiber and receiving the backscattered signal therefrom comprises sending a pulsed light or a continuous-wave light to the optical fiber with an interrogator and collecting the backscatter signal from the optical fiber with the interrogator.

12. The method of claim 8, further comprising comparing a reference signal based on the light transmitted into the optical fiber to the backscatter signal from the optical fiber.

13. The method of claim 12, further comprising generating the light for transmitting into the optical fiber and splitting the light via a main interferometer for generating the reference signal and for transmitting into the optical fiber.

14. The method of claim 13, further comprising generating a clock signal via an auxiliary interferometer receiving the light from the light source and configured to provide a clock signal based thereon.

15. The method of claim 8, wherein determining the real-time shape information relating to the transmission line comprises performing Rayleigh scattering-based optical frequency domain reflectometry on the backscatter signal.

16. A system comprising:
an optical fiber associated with an electrical transmission line;
a light source;
a main interferometer receiving light from the light source, the main interferometer configured to generate a reference signal as a function of a portion of the received light and to transmit a portion of the received light to an optical fiber under test, the main interferometer further configured to receive a backscatter signal from light reflected in the optical fiber and compare the reference signal to the backscatter signal;
an auxiliary interferometer receiving light from the light source and configured to provide a clock signal based thereon; and
a strain processor configured for determining a strain distribution along a length of the optical fiber based on the backscatter signal and the reference signal and for determining real-time shape information relating to the transmission line as a function of the determined strain distribution of the optical fiber, the strain processor further configured for determining a temperature distribution of the optical fiber based on the backscatter signal and the reference signal, the determined temperature distribution being representative of a corresponding temperature distribution of the transmission line.

17. The system of claim 16, wherein the main and auxiliary interferometers comprise a Rayleigh scattering-based optical frequency domain reflectometry sensor.

* * * * *